March 6, 1956     P. AITA     2,737,570
ELECTRIC SOLDERING IRON
Filed Aug. 10, 1953
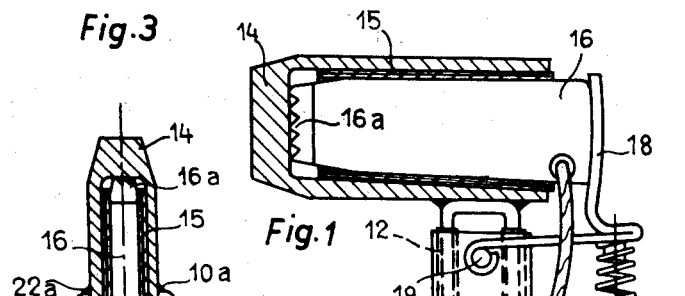
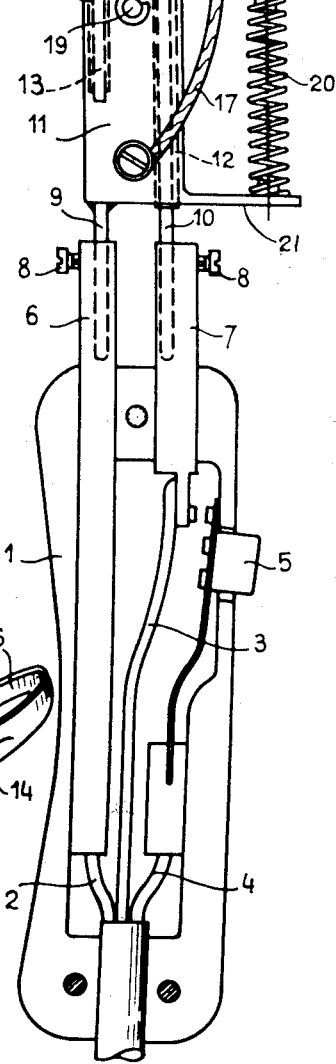
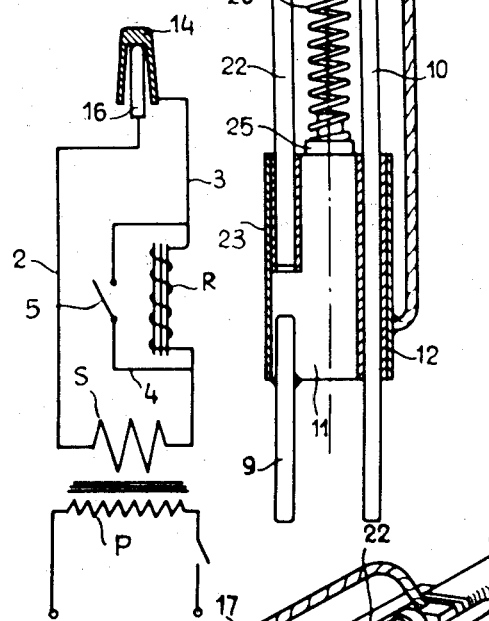
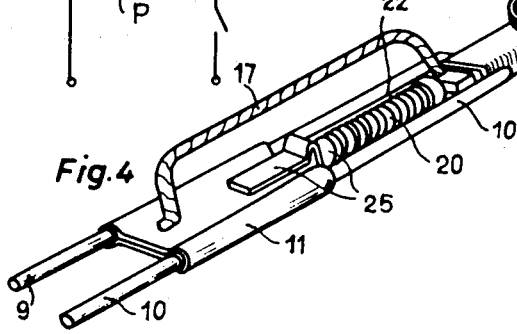
*Paolo Aita*

United States Patent Office 2,737,570
Patented Mar. 6, 1956

2,737,570

ELECTRIC SOLDERING IRON

Paolo Aita, Turin, Italy

Application August 10, 1953, Serial No. 373,367

Claims priority, application Italy August 27, 1952

4 Claims. (Cl. 219—26)

This invention relates to electric soldering irons fed at a low voltage from a storage battery or the secondary circuit of a transformer over a switch.

The first object of this invention is to provide an electric soldering iron in which the soldering bit is heated by effect of the resistance to the flow of current opposed by an imperfect contact provided between the soldering bit and an electrode contained therein. The imperfect contact is obtained, for instance, by a serration at the end of the electrode which is kept in contact with the soldering bit by the pressure of a spring, the spring serving moreover for dissasembling the electrode from the inside of the soldering bit.

The electrode is made of iron, copper or other preferably stainless metal.

The invention shall now be described in detail with reference to the accompanying drawing which shows by way of example some embodiments thereof.

Figure 1 is a part sectional front view of the soldering iron according to this invention.

Figure 2 is an electric diagram of the current supply to the soldering bit.

Figure 3 shows a modification of Figure 1, and

Figure 4 is a perspective view of a soldering iron provided with a melting sump on the soldering bit.

1 denotes the insulating grip of the soldering iron, enclosing three cables 2, 3, 4 leading to the secondary winding S of a transformer and adapted to feed over a switch 5 and an inductive resistance R, two plug and socket contacts 6, 7 projecting at the opposite end of the grip and holding by means of set screws 8 leads 9, 10, respectively, carried by a metallic support 11. The inductive resistance R acts as a limiter for the current flowing through the circuit of the winding S, when the switch 5 is open. The lead 9 is welded to the support and is of smaller length, the lead 10 extends throughout the support 11 and is bent at its end to a U-shape. Both the main branch 10 and bent over branch 13 are held to the support 11 through the interposition of electrically insulating material 12.

The soldering bit 14, which is made of iron or other preferably stainless metal, is secured to the bent portion of the lead 10. An iron alloy with 34% nickel is more particularly suitable, this alloy being stainless and satisfactorily adhering to tin. The soldering bit is hollow and encloses an electrode 16 in the form of a flat parallelepiped of iron, copper or other preferably stainless metal, which is insulated at its sides from the soldering bit by means of an insulating element 15 and is formed at one end with a serration 16a or taper in order to establish an imperfect contact with the inside of the soldering bit. The electrode 16 is electrically connected over a lead 17 to the support 11 and socket contact 6, the soldering bit 14 being electrically connected over the lead 10 to the socket contact 7.

The electrode 16 is pushed against the soldering bit in order to close the electric circuit through an imperfect contact by a bell crank shaped member 18 oscillating about a pivot 19 carried by the support 11 and subjected in turn to the action of a spring 20 bearing against an extension 21 provided on the support 11.

The imperfect contact established by the serration 16a on the electrode increases the resistance against flow of the electric current, locally heating the soldering bit 14.

According to the modification shown in Figure 3, the soldering bit 14 is arranged axially of the handle of the soldering iron and is welded on one side at 10a to the lead 10 on the other side at 22a to a metallic member 22. The lead 10 and member 22 are secured to the support 11 by means of insulating elements 12, 23, respectively. The spring 20 acts on the electrode 16 by means of a button 24 and bears against the support 11 through the interposition of a further button 25 fitted to the support.

According to the modification shown in Figure 4, the soldering bit 14 has fitted thereto a sump 26 serving for melting the tin or similar solder.

The unit comprising the soldering bit, electrode and support therefor may be replaced on the handle by removing the leads 9, 10 from the socket contacts 6, 7 by loosening the set screws 8.

What I claim is:

1. Electric soldering iron comprising a hollow soldering bit and a metallic electrode enclosed therein and arranged as to establish an imperfect contact with said soldering bit, whereby a heating resistance is formed opposing the flow of current from said electrode to said bit, and having its one end protruding outwardly from said hollow soldering bit, a pair of parallel metallic electrod-conductive rods secured to said bit and each fitted in a socket of insulating material held in a support of electro-conductive metal, one of said rods extending throughout said support and protruding therefrom, the other rod ending inside the support, a third rod of electroconductive metal parallel with the above mentioned rods being secured to the support at its end remote from the bit, thereby forming a two-pole plug-member, each of the rods forming said plug member being fitted in a socket supported by a handle of insulating material said handle being hollow and having in its hollow interior a switch for connection to a lead supplying electric current to said sockets, the electrode being urged against the bottom of the hollow bit by a spring means interposed between the end of the electrode protruding from the bit and the end of said support facing the latter.

2. Electric soldering iron as claimed in claim 1, wherein the rods connecting the bit to the support are secured to the opposite lateral walls of the bit and are arranged parallel with its longitudinal plane of symmetry, the spring means acting on the electrode consisting of a helical spring bearing at its opposite ends against a seat provided at the end of the electrode opposing the end contacting the bottom of the hollow bit, and against a seat provided at the end of the support facing the bit, and arranged between said rods secured to the bit.

3. Electric soldering iron as claimed in claim 1, wherein said rods connecting the bit to the support are secured to one of the lateral walls and are arranged at right angles thereto, the electrode being urged towards the bottom of the bit by means of a helical spring interposed between a lateral extension on the support and one arm of a bell crank lever hinged to said support, the other arm of said lever bearing on the end of the electrode protruding from the bit.

4. An electric soldering iron as claimed in claim 1 wherein the metallic electrode is in the form of a flat parallelepiped fitted within the hollow of the bit and a layer of insulating material spacing said electrode from the inner wall surface of said bit, said electrode being provided at its end abutting the bottom of the bit with a number of serrations.

References Cited in the file of this patent

UNITED STATES PATENTS

| | | |
|---|---|---|
| 452,056 | Zipernowsky | May 12, 1891 |
| 497,793 | Jenkins | May 23, 1893 |
| 997,044 | Danko | July 4, 1911 |
| 1,463,951 | Groven | Aug. 7, 1923 |
| 1,533,959 | Wagner | Apr. 14, 1925 |
| 1,659,911 | Fay | Feb. 21, 1928 |
| 2,112,068 | Cole | Mar. 22, 1938 |
| 2,211,128 | Kinney | Aug. 13, 1940 |
| 2,244,576 | Schnebelan | June 3, 1941 |
| 2,293,455 | Disch et al. | Aug. 18, 1942 |
| 2,430,666 | Burger | Nov. 11, 1947 |
| 2,469,479 | Shay | May 10, 1949 |
| 2,501,192 | Scholler | Mar. 21, 1950 |
| 2,542,629 | Clawson | Feb. 20, 1951 |

FOREIGN PATENTS

| | | |
|---|---|---|
| 550,333 | Great Britain | Jan. 4, 1943 |